Dec. 9, 1930.  G. H. WALKER  1,784,212

HYDRAULIC CLUTCH

Filed Jan. 9, 1929  3 Sheets-Sheet 1

INVENTOR.
G. H. Walker

Dec. 9, 1930.   G. H. WALKER   1,784,212
HYDRAULIC CLUTCH
Filed Jan. 9, 1929   3 Sheets-Sheet 3

INVENTOR.
G. H. Walker

Patented Dec. 9, 1930

1,784,212

UNITED STATES PATENT OFFICE

GEORGE HENRY WALKER, OF WORCESTER, ENGLAND, ASSIGNOR TO HEENAN & FROUDE LIMITED, OF WORCESTER, ENGLAND

HYDRAULIC CLUTCH

Application filed January 9, 1929, Serial No. 331,358, and in Great Britain January 20, 1928.

This invention relates to improvements in hydraulic clutches of the type in which power is transferred from the driving to the driven element by hydraulic reaction without the aid of solid friction.

In this type of clutch, power can only be transmitted by virtue of relative motion between driving and driven elements i. e. slip is necessary. The amount of slip can be rendered very small by suitably proportioning the clutch, but even so, slight heating of the working liquid due to slip is unavoidable. In order to limit the temperature rise of the liquid, arrangements are usually made to recirculate the liquid through cooling devices or to supply fresh cool liquid to the working compartment of the clutch. Hitherto the passages for entry of the cool liquid into the clutch have communicated from the exterior with a part of the clutch where, due to the effects of centrifugal force and of hydraulic transmission of power, the pressure of the liquid is high. This has necessitated the use of a liquid-circulating pump developing a comparatively high pressure, to overcome the resistance to entry of the liquid.

According to the present invention the clutch is formed of two members, a rotor and an outer casing both of which are adapted to rotate and which are formed with cups or pockets in which the liquid circulates, passages being formed in the vanes separating adjacent cups in the casing through which the fresh cooled liquid enters and is conveyed to the centre of the cups or pockets where the pressure is at a minimum owing to the eddies or vortices which are set up therein, the heated liquid being discharged through outlet passages at or near the periphery of the casing.

In carrying out the invention one or more rotors are mounted upon a shaft transmitting the drive from the clutch and revolving within a casing which is coupled by shafting or otherwise geared to the machine or apparatus supplying the power. The casing itself is free to revolve upon bearings which may be either external to the casing or may be interposed between the casing and rotor shaft. The casing is capable of being filled with liquid such as oil, water or in exceptional instances with a heavy liquid such as mercury, and will then transmit power by hydraulic interaction between rotor and casing; or it may be emptied of liquid, when the power transmitted will be nil; or it may be partially emptied, allowing considerable slip to take place between driving and driven shafting.

In order to avoid the use of a high pressure liquid-circulating pump and the consequent loss of efficiency, the rotor or rotors and casing employed may be similar to those of the "Froude" hydraulic dynamometer, as described in British Patents Nos. 24,949 of 1910 (Figs. 2 and 3), 16,773 of 1913, and 243,887 of 1924 (Fig. 2).

The invention will be described with reference to the accompanying drawings:—

Figure 1:
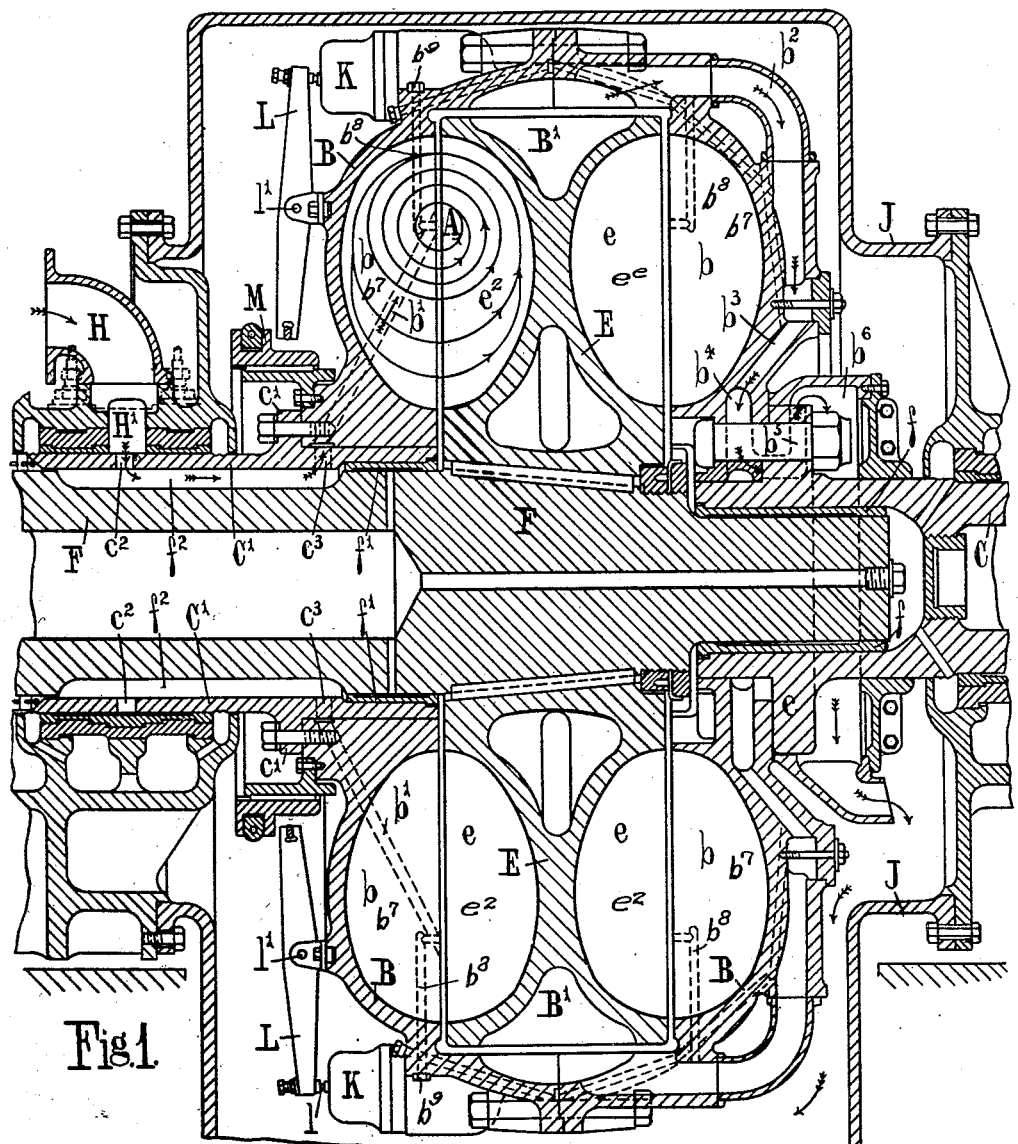
Fig. 1 is a longitudinal section through an hydraulic clutch in which the rotor and casing are similar to those of the "Froude" hydraulic dynamometer referred to above.

In the form of hydraulic clutch shown in the drawings the driving element is formed by the casing B which is mounted on a shaft C, the free end of which is fitted with a coupling (not shown) or other suitable means for connecting the shaft with the prime mover. As shown the casing B is bolted to the flange $c$ of the shaft C but it may be keyed or otherwise affixed thereto.

The rotor E is mounted on a second shaft F extending in the opposite direction to the shaft C and fitted with a coupling (not shown) or other suitable means for connecting the shaft with the driven machinery. The rotor E is shown keyed on to the shaft F but it may be affixed thereto in any other convenient manner. The inner end of the shaft C is hollow and the inner end of the shaft F projects into this hollow a lining $f$ being provided between them to form a bearing surface for the end of the shaft F.

The part of the casing B which extends beyond the inner end of the shaft C is bolted to a flange $c^1$ on a sleeve $C^1$ surrounding the shaft F, a bearing surface $f^1$ being arranged between the shaft F and sleeve $C^1$ to allow of their freely rotating in relation to one another.

Cups or pockets $e$ are formed in the rotor E and similar cups or pockets $b$ are formed in the casing B and the liquid circulates in these pockets under the influence of the rotation of the rotor E creating eddies or vortices which resist relative motion between the casing B and the rotor E and tend to drive the rotor E in the same direction of rotation as the casing B. Adjacent cups in the rotor E and also in the casing B are separated by vanes $e^2$ and $b^7$ respectively, passages $b^1$ being formed in the vanes $b^7$ of the casing B for the entry of the liquid into the cups. The cool liquid enters the apparatus through a gland H the non-rotating part of which is provided with a port or ports $H^1$. The port or ports $H^1$ are under the control of a valve not shown in the drawing by which liquid may be admitted to or shut off from the clutch.

The liquid passes from the gland H through the ring of apertures $c^2$ in the sleeve $C^1$ to the annular space $f^2$ between the sleeve $C^1$ and the shaft F and thence through the ring of apertures $c^3$ in the sleeve $C^1$ to the passages $b^1$ in the vanes of the casing B.

The passages $b^1$ deliver the liquid to the centre of the eddies or vortices formed by the rotation of the rotor E where there exists a zone of low pressure approximately corresponding in the drawing with the point A.

The interior of the casing B under working conditions contains liquid at a higher pressure than exists in the zone A. A portion of the liquid is normally allowed to pass into the annular space $B^1$ between the casing B and rotor E and thence as indicated by the arrows through the passages $b^2$, $b^3$, $b^4$ and $b^5$ to the annular space $b^6$ from whence it passes to the interior of a non-rotating guard or cover J surrounding the boss of the clutch casing. The guard J collects the heated liquid and discharges it into a sump $J^1$ from which it may be sucked by a circulating pump passed through suitable coolers and readmitted to the inlet valve of the clutch.

Passages $b^8$ closed by studs $b^9$ are provided in the casing B by which air may be allowed to escape from the interior or into which testing instruments may be screwed.

In some cases, it may be desirable that the transmission of power from the driving to the driven element may be rapidly interrupted. To enable this to be done, the casing is provided with quick acting outlet valves K which normally remain closed but can be mechanically or otherwise opened suddenly thereby putting the zone of high pressure in the casing B into communication with the exterior and allowing the liquid in the clutch casing to escape rapidly.

Figure 2:
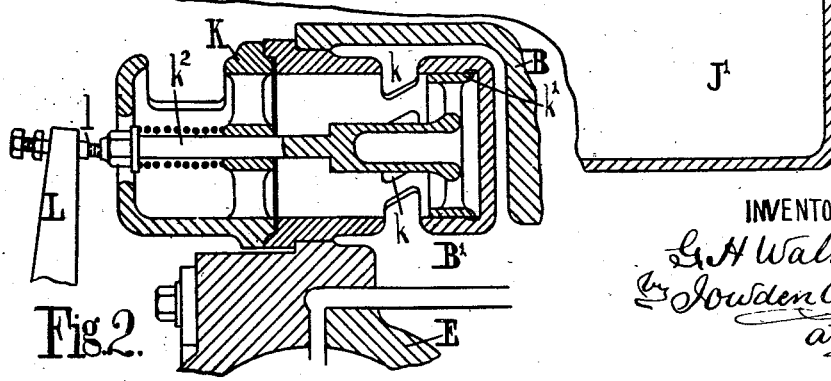
Fig. 2 is a section of a quick acting outlet valve for rapidly discharging the liquid from the high pressure zone of the casing.
Figure 3:
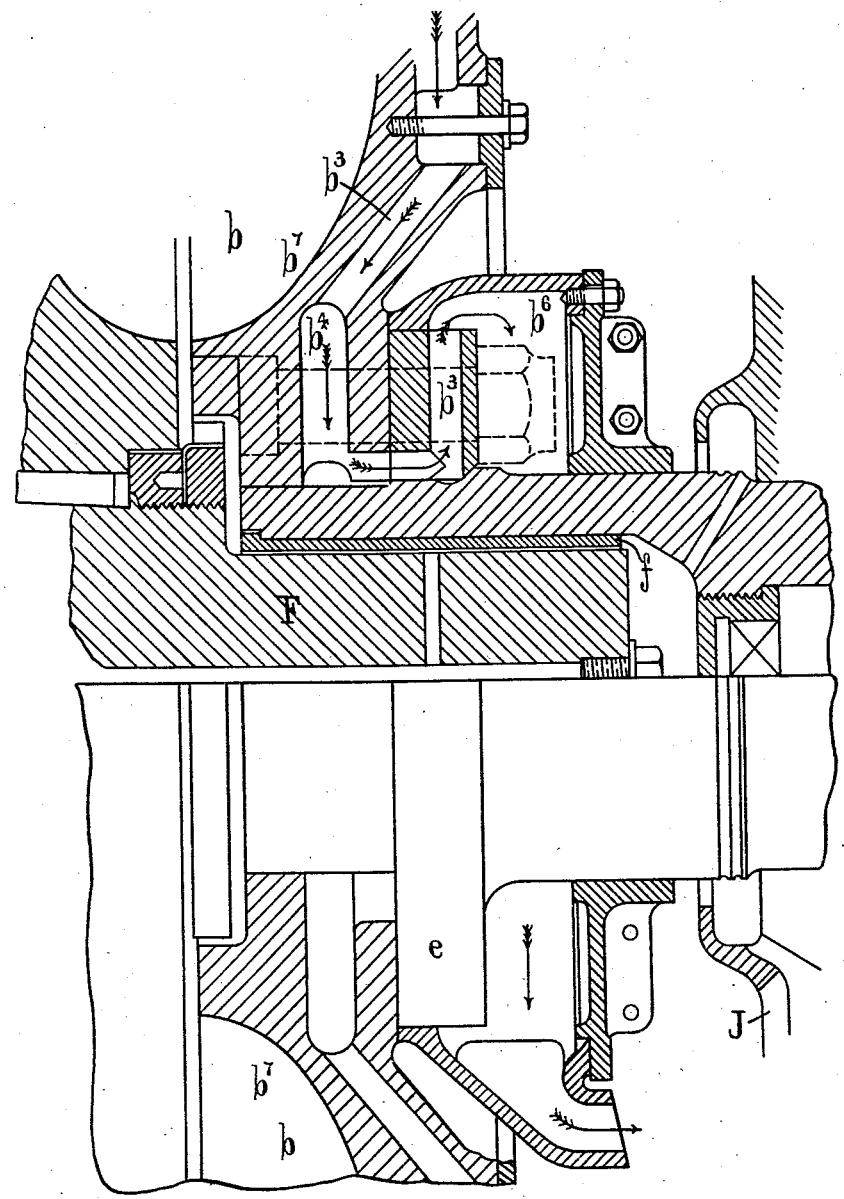
Fig. 3 is a detail view of the outlet passages.
Figure 4:
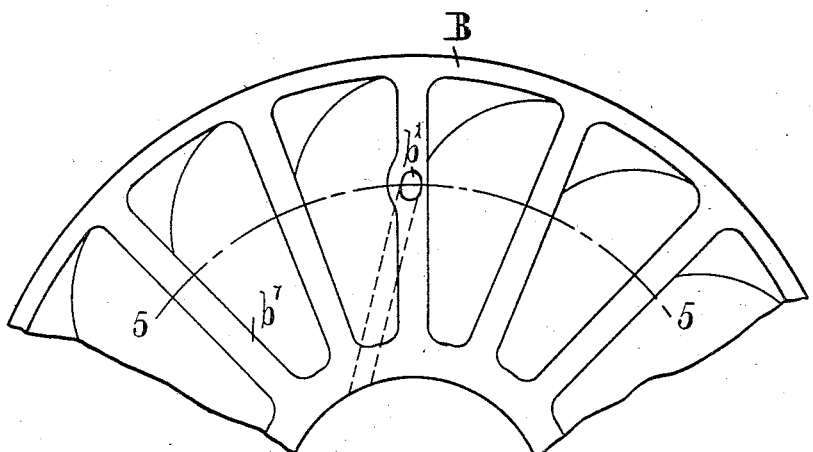
Fig. 4 is a side view of the cups in the casing B.
Figure 5:
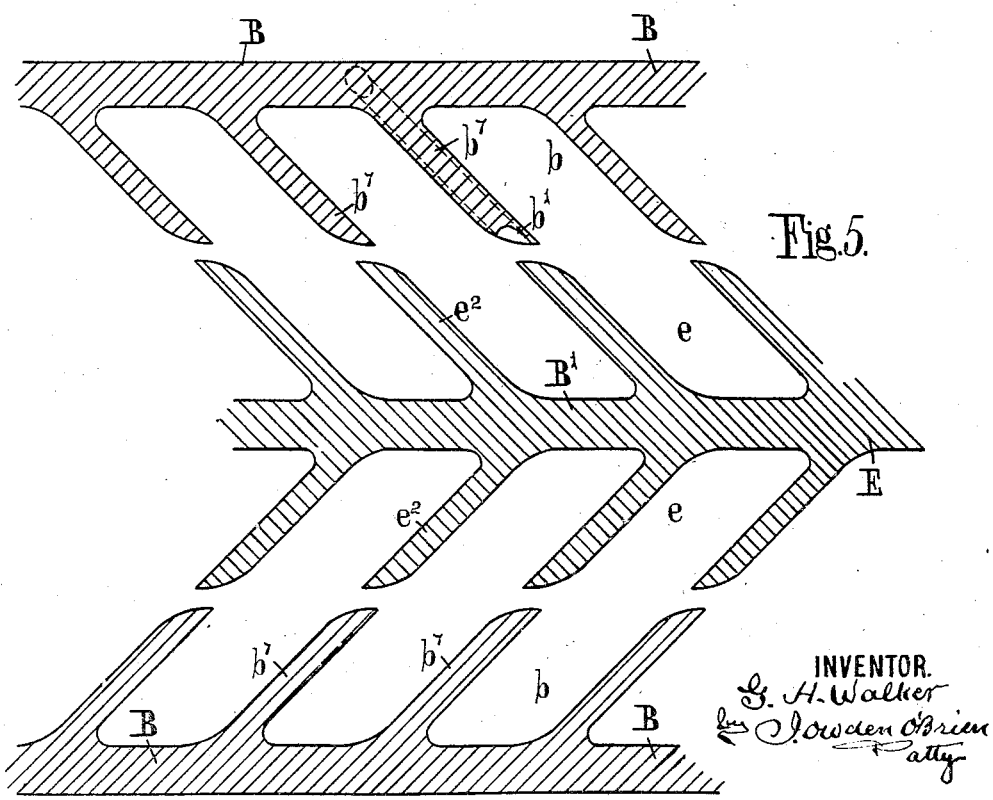
Fig. 5 is a section on line 5—5 Fig. 4.

In the form of valve K shown in Fig. 2 a ring of ports $k$ communicate with the annular space $B^1$ between the rotor E and the casing B where the pressure of the liquid is high. These ports are normally covered by the cylindrical slide $k^1$ (they are shown uncovered in the drawing). The slide $k^1$ is mounted on a spring controlled rod $k^2$ the end of which is engaged by a projection $l$ on the end of the lever L fulcrumed at $l^1$ on the casing B. The other end of each lever L is connected to a sliding ring M operated by a fork or other device so that by moving this ring M outward from the casing, the slide $k^1$ is moved inwards against the action of the spring into the position shown in Fig. 2 to uncover the ports $k$ so that the zone of high pressure $B^1$ is immediately put into communication with the exterior and allows the liquid in the clutch casing to escape rapidly.

What I claim as my invention and desire to protect by Letters Patent is:—

1. A hydraulic clutch of the type referred to comprising the combination with a rotor of a casing adapted to rotate, cups in the rotor, and co-acting cups in the casing, in both of which cups the liquid circulates, vanes separating the adjacent cups of the rotor, vanes separating the adjacent cups of the casing, passages formed in these vanes through which fresh cooled liquid enters and is conveyed to the centres of the cups where the pressure is at a minimum owing to the vortices set up therein, outlet passages near the periphery of the casing through which the heated liquid escapes and a quick acting outlet valve which normally remains closed but which can be suddenly opened to put the zone of high pressure in the casing into communication with the exterior and allow the liquid in the clutch casing to escape rapidly.

2. A hydraulic clutch of the type referred to comprising the combination with a rotor of a casing adapted to rotate, cups in the rotor, and co-acting cups in the casing, in both of which cups the liquid circulates, vanes separating the adjacent cups of the rotor, vanes separating the adjacent cups of the casing, passages formed in these vanes through which fresh cooled liquid enters and is conveyed to the centres of the cups where the pressure is at a minimum owing to the vortices set up therein, outlet passages near the periphery of the casing through which the heated liquid escapes, a quick acting outlet valve which normally remains closed but which can be suddenly opened to put the zone of high pressure in the casing into communication with the exterior and allow the liquid in the clutch casing to escape rapidly, and a sump to receive the heated liquid.

In testimony whereof I have hereunto set my hand this 18th day of December, 1928.

GEORGE HENRY WALKER.